Figure 1:
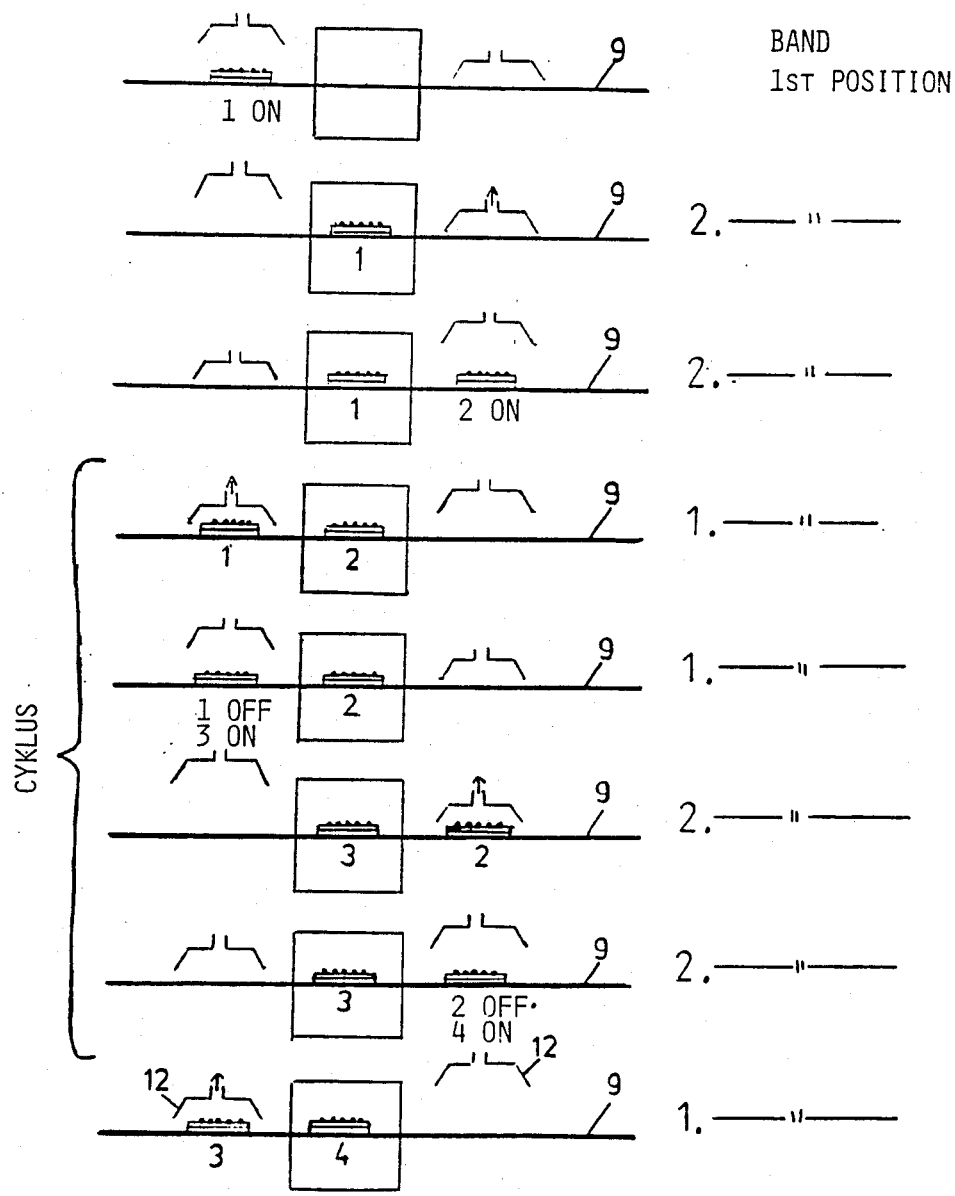

United States Patent [19]

Lang

[11] Patent Number: 4,873,040
[45] Date of Patent: Oct. 10, 1989

[54] METHOD FOR PRODUCTION OF PILED MATS WITH A RUBBER BACKING ON A VULCANIZING PRESS

[75] Inventor: Aage Lang, Kolind, Denmark

[73] Assignee: Milliken Research Corporation, Spartanburg, S.C.

[21] Appl. No.: 256,965

[22] Filed: Oct. 13, 1988

[30] Foreign Application Priority Data

Jun. 30, 1988 [DK] Denmark ............................ 3643/88

[51] Int. Cl.$^4$ ............................................. B29C 39/12
[52] U.S. Cl. .................................... 264/102; 264/237; 264/297.1
[58] Field of Search ...................... 264/102, 237, 297.5, 264/348, 347, 319, 297.1, DIG. 65, 322; 425/73, 74, 384, 397, 403.1, 502, 520

[56] References Cited

U.S. PATENT DOCUMENTS

| | | |
|---|---|---|
| 2,169,146 | 8/1939 | Iverson . |
| 2,663,902 | 12/1953 | Anderson . |
| 2,973,796 | 3/1961 | Huetter ............................... 425/73 |
| 3,183,551 | 5/1965 | Johnson . |
| 3,311,951 | 4/1967 | Borchard et al. . |
| 3,671,159 | 6/1972 | Greenberg et al. . |
| 3,825,378 | 7/1974 | Dart et al. ............................ 425/4 R |
| 3,872,786 | 3/1975 | Holton ................................. 100/218 |
| 3,969,051 | 7/1976 | Houila ................................. 425/384 |
| 4,447,201 | 5/1984 | Knudsen ............................. 425/397 |

*Primary Examiner*—Jan H. Silbaugh
*Assistant Examiner*—Nicholas Krisch
*Attorney, Agent, or Firm*—Earle R. Marden; H. William Petry

[57] ABSTRACT

Through a method for production of piled mats (1-3) with rubber backing on a vulcanizing press (P) with a stationary vulcanizing heater plate (8) where articles (1-3) to be vulcanized are conveyed into position in and out of the press (P) from one and the other side of it using a heat conducting conveyor belt (9), each of the vulcanized articles (1) will be conveyed as soon as it leaves the press (P) on the conveyor belt (9) after the press vulcanizing operation to one of two cooling and degassing stations (KA1, KA2) while at the same time a next unvulcanized article (2) is conveyed on the same conveyor belt (9) into its position in the press (P) while said next article (2) is conveyed after the press vulcanizing operation to the second of the two cooling and degassing stations (KA1, KA2) while at the same time a next unvulcanized article (3) is conveyed on the conveyor belt (9) into its position in the press (P) in connection with which each article at the cooling and degassing stations is removed after the cooling and degassing operation, and the next unvulcanized article is placed on the conveyor belt. Thus, vapours and gases from the hot articles are located at particular points in the system and may be removed selectively from there so as to prevent pollution of the manufacturing room air, thus producing energy savings since the manufacturing room air replacement may be reduced.

1 Claim, 3 Drawing Sheets

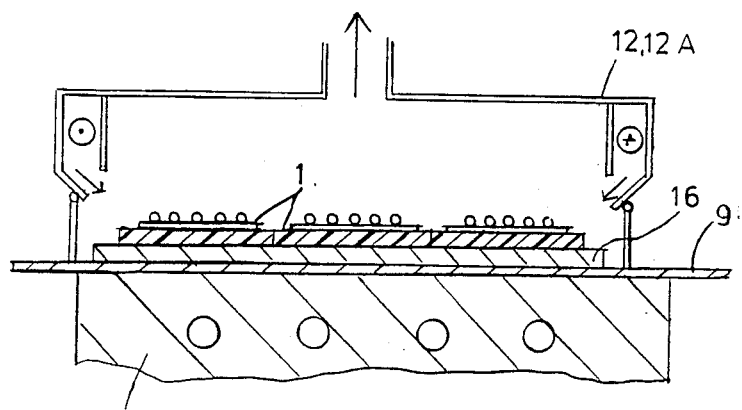
FIG. 3A (KA1,KA2,K1,K2)
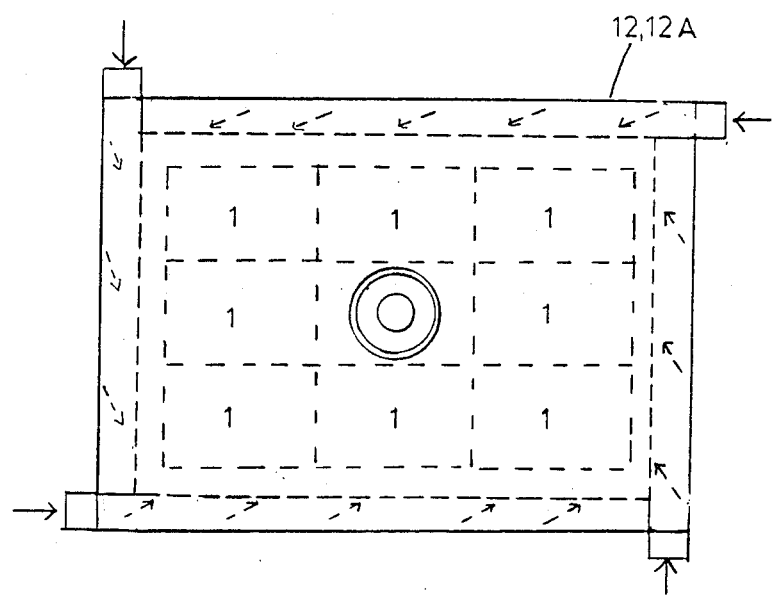
FIG. 3B

METHOD FOR PRODUCTION OF PILED MATS WITH A RUBBER BACKING ON A VULCANIZING PRESS

The present invention concerns a method for production of piled mats with a rubber backing on a vulcanizing press with a stationary vulcanizing heater plate where the articles to be vulcanized are fed into position and out of the press from its one and the other side through a heat conducting conveyor belt. From U.S. Pat. No. 4,447,201 it is known to make press vulcanizing in this way. According to said patent specifications, a sheet or plate-shaped unvulcanized rubber article and a pile layer placed on top of that are placed on a conveyor belt which will then convey the article with the pile layer into a vulcanizing press for press vulcanizing between a hot squeeze plate and a nonheated, mouldable to the article, pressure yielding squeeze plate which in said patent specifications was a press diaphragm. After the press vulcanizing, the now vulcanized rubber article with vulcanized pile layer was conveyed out of the press on the conveyor belt which could be fed from one roll to another storage roll for conveyor belt or reversibly be moved forwards and backwards between rolls along with the placing of the articles at the two press sides. After the press operation, the articles were removed in hot condition from the conveyor belt and placed on a separate cooling surface from where they were removed after cooling to a finished article store.

Consequently, due to the high vulcanizing temperature of 180° C. the still hot articles were hard to handle, requiring extra cooling time on the cooling plate. To cut the cooling time on the cooling plate, the articles were exposed to a cooling air flow from a blowing unit. Most of these operations caused the air in the manufacturing room to be rich in gases, and powerful air conditioning systems including the resultant high cost of air heating, especially at wintertime, were required to produce an atmosphere in the manufacturing room acceptable to the personnel.

It is the purpose of this invention to remedy said drawbacks, and this was achieved to the invention through a method characteristic in that each of the vulcanized articles will, as soon as it leaves the press on the conveyor belt after the press vulcanizing operation, be conveyed to one of two cooling and degassing stations while at the same time the next unvulcanized article is carried on the same conveyor belt into its place in the press, that said next article after the press vulcanizing operation is conveyed to the other of the two cooling and degassing stations while at the same time the next unvulcanized article on the conveyor belt is conveyed into its place in the press, that each article in the cooling and degassing stations are removed after the cooling degassing operation, and that the next unvulcanized article is placed on the conveyor belt. Thus providing a method by which the atmosphere in the manufacturing room is not polluted appreciably, and where the separate cooling operation is integrated in the conveyor belt area and may proceed during the entire or part of the time which the press takes to press vulcanize a article.

Wherever there are three workstations on the conveyor belt, i.e. two delivery and feeding stations and one press station, the cooling and degassing are effected at each delivery and feeding station appropriately under an exhaust hood placed vertically shiftable which is shifted to its bottom position not later than at the same time as a article is received from the press to the particular station, and which is shifted to its top position after the cooling and degassing operation and before the end of the press vulcanizing operation of the next article so that the cooled and degassed article may be removed, and a new unvulcanized article may have time to be positioned correctly at the delivery and feeding station before the article in the vulcanizing press is conveyed out of same for cooling and degassing, each delivery and feeding station working as a cooling and degassing station, too.

Thus achieving that there need not be more than three workstations on the conveyor belt but on the other hand only part of the press time will be available to the personnel for removal of a finished vulcanized article and for the feeding of an unvulcanized article.

The bottom position of the exhaust hood above the conveyor belt is appropriately such as will allow for air suction from the surroundings along the lower circumference of the exhaust hood, and the exhaust capacity has been appropriately adapted so that inside the exhaust hood at least a slight negative pressure prevails during the cooling and degassing operation. Thus preventing an effective gas leakage to the environment during the degassing operation.

Figure 2:
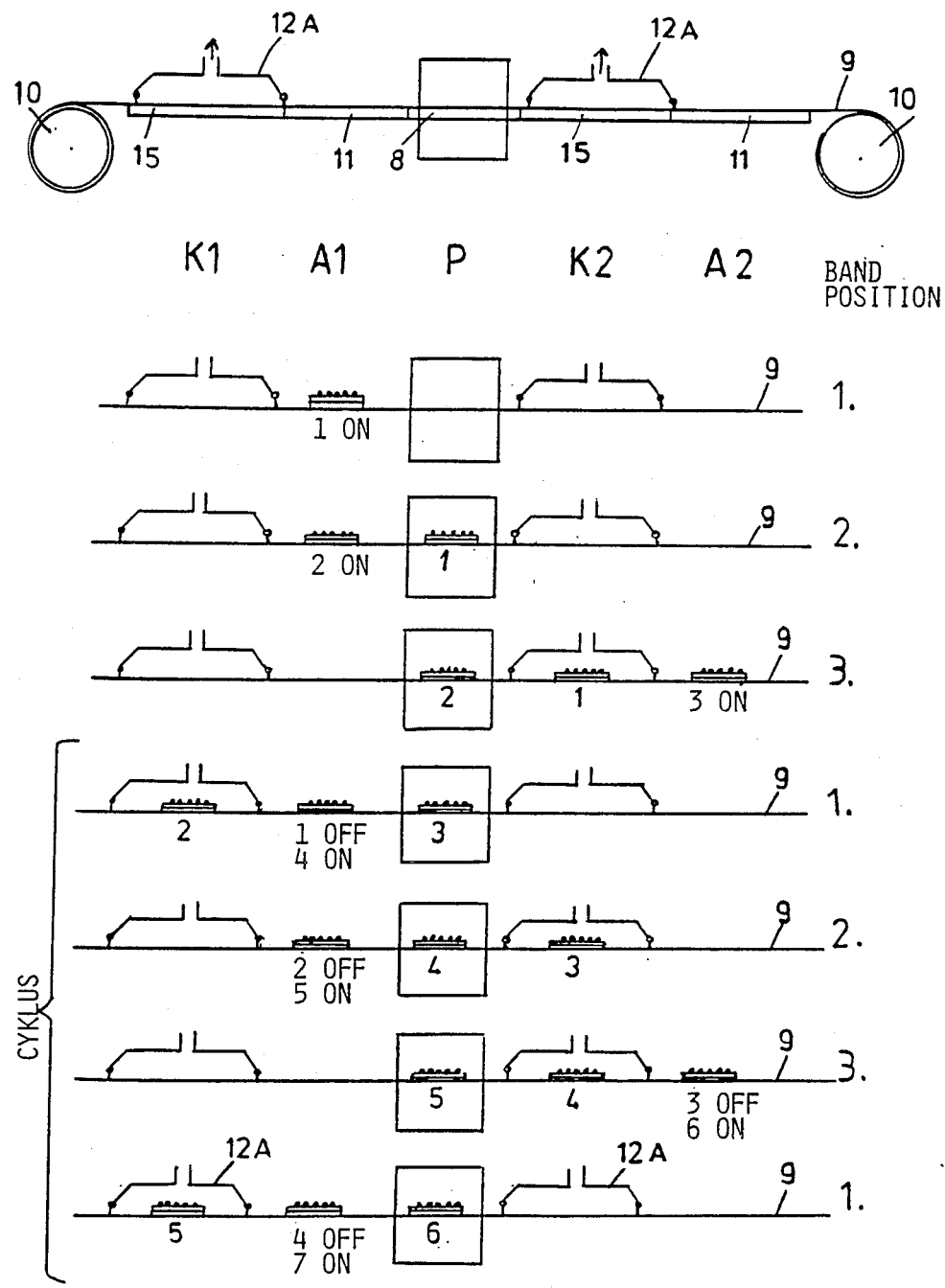

Below, the invention will be further explained in connection with a couple of embodiments and with reference to the drawing where FIG. 1 shows a conveyor belt with three workstations and various working operations shown in a diagram below, FIG. 2 shows a conveyor belt with five workstations and working operations shown below by diagram, FIG. 3 shows an embodiment of an exhaust hood receiving separate cooling air.

FIG. 1 shows at the top a system for production of piled mats with rubber backing on a vulcanizing press 3 with a stationary vulcanizing heater plate 8 where articles 1–4 to be vulcanized are fed in and out of the press P from one and the other side of this through a heat conducting conveyor belt 9 which may be moved forwards and backwards through the press using drive pulleys 10. In addition to the press P, constituting a first workstation, there are another two workstations, KA1 and KA2, each consisting of a possibly cooled worktable 11, supporting the belt 9 at the workstations. Above each worktable, KA1 and KA2, an exhaust hood 12 has been placed, vertically shiftable using hoists 14 between two extreme positions, i.e. a bottom position in which it is lowered down over a finished vulcanized and still hot article for suction of cooling air from the surroundings, and exhaust of vapours and gases from the article in the exhaust hood inside. The exhaust from the exhaust hood is made through an axial flexible pipe, allowing for the raising and lowering of the hood. At the hood top position, it allows for the removal of a finished cooled article and the feeding of a next unvulcanized article. The suction capacity is adapted so that inside the exhaust hood 12 during the cooling and degassing operation at least a slight negative pressure will prevail. This reduces the risk of vapours and gases from the article escaping to the environment.

The method has been organized so that each of the vulcanized articles 1 will, as soon as it leaves the press P on the conveyor belt 9 after the press vulcanizing operation, be conveyed to a KA1 by the two cooling and degassing stations while at the same time a next unvulcanized article 2 on the same conveyor belt 9 will be conveyed into its place in the press P from the station KA2. After the press vulcanizing operation, said next article 2 is conveyed from the press P to the other KA2 by the two cooling and degassing stations while at the same time a next unvulcanized article 3 on conveyor belt 9 is conveyed from station KA1 into its place in the press P. After the cooling and degassing operation, each article on the cooling and degassing stations is removed, and the next unvulcanized article is placd on the conveyor belt 9. This is illustrated in FIG. 1. At the first position of the belt, the article 1 is placed on the station KA1 and is conveyed by the shifting of the belt to its other position into the press P where the press vulcanizing is made. During this, the exhaust hood 12 is raised above workstation KA2 so that an operator may feed the article 2 on to the conveyor belt 9. After the press vulcanizing of the article 1, the belt is conveyed back to its first position, and thus the article 2 is placed in the press P, and the article 1 is conveyed in under the lowered exhaust 12 on station KA1 for removal of gases and vapours from the subject. Then article 1 is removed, and an article 3 is fed on station KA1, and when the article 2 is press vulcanized, the belt is again moved to the right to its other position while at the same time, the article 3 is fed into the press P, and the article 2 is conveyed in under the now lowered exhaust hood 12 on station KA2. After cooling of the article 2, the hood 12 is raised, and the next article 4 is fed to the worktable 11 on station KA2. When finishing the press operation for the article 3, the belt is moved to the left to its first position, thus moving the article 3 to station KA 1 for cooling and degassing while the article 4 is conveyed into the press P. This is illustrated in FIG. 1, and the process working cycle has been intimated by a "Tuborg".

FIG. 2 shows a system for production of piled mats with five workstations and two stationary exhaust hoods 12A. In addition to the two worktables 11 on workstations A1 and A2, now serving only for removal and feeding of articles 1–7, there are here also two cooling tables 15 at each of the cooling and degassing stations K1 and K2. The press P is the same as before. In this process, the conveyor belt has three positions: A first, a second, and a third, and after each of two press operations the belt will convey the articles one workstation in one direction and after a third press operation the belt will convey the articles two workstations in another direction. In other words, the conveyor belt 9 is moved after both a first and a second press vulcanizing operation one station change length in one shift direction of the convey belt 9, and after a third press vulcanizing operation the belt 9 is conveyed two station change lengths in the second and opposite shift direction where a station change length corresponds to the distance between the vulcanizing press P heater plate centre and the centre of the nearest neighbouring station A1 or K2 counting in the shift direcion of the conveyor belt. At each removal and feeding station A1 or A2, only the removal of finished articles and the feeding of unvulcanized articles are now being effected but no cooling or degassing since these operations are conducted at stations K1 and K2. Through this process, illustrated by diagram in FIG. 2, and appearing to be self-explanatory, more time is obtained for feeding and removal of the articles but without increasing the production time. FIG. 2 illustrates that the first unvulcanized article 1 placed on the removal and feeding station A1 is fed successively to the press vulcanizing station P, to the cooling and degassing station K2, to the removal and feeding station A1, and to the finished work store. Another unvulcanized article 2 placed on the removal and feeding station A1 will get the same treatment as the article 1 while a third unvulcanized article 3 placed on the removal and feed station A2 is conveyed successively to the press vulcanizing station P, to the station K2, to the station A2, and finally to the finished article store.

In addition to the exhaust which may occur at stations KA1, KA2, K1, and K2, there may also be an exhaust at the press vulcanizing station during and after each press vulcanizing operation through exhaust devices positioned above and round along the edge of the press P heater plate 8.

Simultaneously with the cooling and the degassing of the vulcanized articles at a cooling and degassing station KA1, KA2, K1, K2, tere may be an appropriate cooling of the bottom of the articles through the conveyor belt 9 and a cooling pate 11, 15 and through a bottom moulding plate 16 possibly located between the conveyor belt 9 and the article for the article bottom which moulding plate 16 will then be between the article and the conveyor belt 9 at all stations KA1, KA2, K1, K2, A1, A2, and P.

At the bottom along their skirts exhaust hoods 12 or 12a may have a yielding screen allowing for the ambient air to be sucked in under the hoods, and for the articles to be freely moved in and out from the area of the hoods. In that such yielding screening will offer a certain resistance to air suction, it will be easier to maintain the vacuum under the exhaust hoods, and the risk of gas leakage to the environment will be reduced in the bottom position of the exhaust hoods. Any such screening around the bottom edge of hoods may be replaced by an air blanket in that cooling air, for instance outside air, is fed along the exhaust hood circumference while at the same time air and gases in the hood inside are being exhausted. This is illustrated in FIG. 3, also showing that the cooling air supplied is fed tangentially to the exhaust hood 12 or 12a aiming at an eddying in the exhaust air for better cooling and degassing of articles.

What is claimed is:

1. Method to produce a rubber-backed pile mat article on a vulcanizing press with a stationary heater plate using an intermittently operated heat conducting conveyor belt comprising the steps of: placing a first article on the conveyor belt at a first mold station for feeding and removing articles, then indexing the conveyor belt to move the article into the vulcanizing press, then vulcanizing the first article in the vulcanizing press and placing a second article on the conveyor belt at the first work station, then indexing the conveyor belt in the same direction as with the first article to move the second article into the vulcanizing press and the first article into a first cooling and degassing station, then vulcanizing the second article in the vulcanizing press, cooling and degassing the first article, and placing a third article on the conveyor belt at a second work station for feeding and removing articles downstream of the first cooling and degassing zone, then reversing the conveyor belt to move the second article to a second cooling and degassing station upstream of the first work station and to place the first article in the first work station and the third article in the vulcanizing press, then vulcanizing the third article while removing the first article from the first work station, cooling and degassing the second article, and placing a fourth unvulcanized article on the conveyor belt at the first work station, then reversing the conveyor belt to move the second article into the first work station, the fourth article into the vulcanizing press and the third article into the first cooling and degassing station, then vulcanizing the fourth article while cooling and degassing the third article and removing the second article from the first work station, then placing a fifth article on the conveyor belt in the first work station, then indexing the conveyor belt in the same direction as the preceding step to place the fifth article into the vulcanizing press, the third article into the second work station, then vulcanizing the fifth article while cooling and degassing the fourth article and removing the third article from the second work station, then placing a fifth article on the conveyor belt in the first work station, then indexing the conveyor belt in the same direction as the preceding step to place the fifth article into the vulcanizing press, the fourth article into the first cooling and degassing station and the third article into the second work station, then vulcanizing the fifth article while cooling and degassing the fourth article and removing the third article from the second work station, then placing a sixth unvulcanized article on the conveyor belt in the second work station and repeating sequentially the enumerated steps to produce further vulcanized articles.

* * * * *